US010728714B2

(12) United States Patent
Al-Daher et al.

(10) Patent No.: US 10,728,714 B2
(45) Date of Patent: Jul. 28, 2020

(54) MOBILE COMMUNICATIONS NETWORK (71) Applicant: British Telecommunications Public Limited Company, London (GB)

(72) Inventors: Zaid Al-Daher, London (GB); Richard Mackenzie, London (GB); Michael Fitch, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 16/085,382

(22) PCT Filed: Mar. 23, 2017

(86) PCT No.: PCT/EP2017/057026
§ 371 (c)(1),
(2) Date: Sep. 14, 2018

(87) PCT Pub. No.: WO2017/167648
PCT Pub. Date: Oct. 5, 2017

(65) Prior Publication Data
US 2019/0104389 A1    Apr. 4, 2019

(30) Foreign Application Priority Data
Mar. 31, 2016 (EP) .................. 16163451

(51) Int. Cl.
*H04W 4/08* (2009.01)
*H04W 76/40* (2018.01)
(Continued)

(52) U.S. Cl.
CPC ............ *H04W 4/08* (2013.01); *H04B 17/309* (2015.01); *H04L 5/0048* (2013.01); *H04W 4/06* (2013.01);
(Continued)

(58) Field of Classification Search
CPC ....... H04W 4/06; H04W 4/08; H04W 72/085; H04W 76/27; H04W 76/40; H04B 17/309; H04L 5/0048
See application file for complete search history.

(56) References Cited

U.S. PATENT DOCUMENTS

| 7,363,039 B2 | 4/2008 | Laroia et al. |
| 7,885,235 B2 | 2/2011 | Mochizuki et al. |

(Continued)

FOREIGN PATENT DOCUMENTS

| CN | 102300168 A | 12/2011 |
| CN | 104540043 A | 4/2015 |

(Continued)

OTHER PUBLICATIONS

3GPP TR 23.768 V12.1.0 (Jun. 2014), "Study on Architecture Enhancements to Support Group Communication System Enablers for LTE (GCSE_LTE)," Technical Report, 3rd Generation Partnership Project, Technical Specification Group Services and System Aspects (Release 12), Jun. 2014, 63 pages.

(Continued)

*Primary Examiner* — Curtis A Alia
(74) *Attorney, Agent, or Firm* — Patterson Thuente Pedersen, P.A.

(57) ABSTRACT

A base station for a mobile communications network is disclosed, in which the base station includes a plurality of transmitters, in which each transmitter is configured to provide transmit radio signals to a plurality of mobile terminals; and a plurality of receivers, in which each receiver is configured to detect receive radio signals from the plurality of mobile terminals. The base station also includes a processor configured to interrogate each of the plurality of mobile terminals for an indication of signal quality of a signal received by the mobile terminal; and to assign each of the plurality of mobile terminals to one of (Continued)

First MBSFN Area 72
Overlapping MBSFN areas 760, 762 reserved for unicast
Second MBSFN Area 74 two groups based on the received indications of signal quality. The mobile terminals assigned to the first group are those that indicate relatively low signal quality and the mobile terminals assigned to the second group are those that indicate relatively high signal quality. The plurality of transmitters are configured to communicate with at least some of the mobile terminals in the first group over unicast and to communicate with the mobile terminals in the second group over multicast.

9 Claims, 5 Drawing Sheets

(51) Int. Cl.
*H04W 4/06* (2009.01)
*H04B 17/309* (2015.01)
*H04L 5/00* (2006.01)
*H04W 72/08* (2009.01)
*H04W 76/27* (2018.01)

(52) U.S. Cl.
CPC ......... *H04W 72/085* (2013.01); *H04W 76/40* (2018.02); *H04W 76/27* (2018.02)

(56) References Cited

U.S. PATENT DOCUMENTS

| | | | |
|---|---|---|---|
| 8,588,171 | B2 | 11/2013 | Fukuoka et al. |
| 8,644,261 | B1 | 2/2014 | Vargantwar et al. |
| 9,001,737 | B2 | 4/2015 | Amerga et al. |
| 9,191,922 | B2 | 11/2015 | Anchan et al. |
| 9,439,171 | B2 | 9/2016 | Phan et al. |
| 9,648,584 | B2 | 5/2017 | Hiben et al. |
| 9,723,523 | B2 | 8/2017 | Purnadi et al. |
| 9,763,151 | B2 | 9/2017 | Kim |
| 1,007,041 | A1 | 9/2018 | Phan et al. |
| 1,021,924 | A1 | 2/2019 | Prasad et al. |
| 1,023,117 | A1 | 3/2019 | Byun et al. |
| 1,027,741 | A1 | 4/2019 | Zhu et al. |
| 2002/0112244 | A1 | 8/2002 | Liou et al. |
| 2008/0132263 | A1* | 6/2008 | Yu ............... H04J 11/0069 455/515 |
| 2008/0267317 | A1 | 10/2008 | Malladi et al. |
| 2009/0274453 | A1 | 11/2009 | Viswambharan et al. |
| 2010/0216454 | A1 | 8/2010 | Ishida et al. |
| 2011/0305184 | A1 | 12/2011 | Hsu et al. |
| 2013/0044614 | A1* | 2/2013 | Aguirre ............... H04W 28/24 370/252 |
| 2013/0229974 | A1 | 9/2013 | Xu et al. |
| 2013/0251329 | A1 | 9/2013 | McCoy et al. |
| 2013/0258935 | A1 | 10/2013 | Zhang et al. |
| 2013/0336173 | A1 | 12/2013 | Mandil et al. |
| 2014/0095668 | A1 | 4/2014 | Oyman et al. |
| 2014/0156800 | A1 | 6/2014 | Falvo |
| 2014/0169255 | A1* | 6/2014 | Zhang ............... H04W 72/005 370/312 |
| 2014/0286222 | A1 | 9/2014 | Yu et al. |
| 2015/0009821 | A1 | 1/2015 | Sridhar et al. |
| 2015/0163379 | A1 | 6/2015 | Herzog et al. |
| 2016/0081070 | A1 | 3/2016 | Xiaodong et al. |
| 2016/0105894 | A1 | 4/2016 | Lu et al. |
| 2016/0234570 | A1 | 8/2016 | Van Deventer et al. |

FOREIGN PATENT DOCUMENTS

| | | | |
|---|---|---|---|
| CN | 104954994 | A | 9/2015 |
| EP | 1650989 | A1 | 4/2006 |
| EP | 2244502 | A1 | 10/2010 |
| EP | 2244502 | B1 | 6/2011 |
| EP | 2606662 | A1 | 6/2013 |
| EP | 2775730 | A1 | 9/2014 |
| EP | 3125582 | A1 | 2/2017 |
| GB | 2483125 | A | 2/2012 |
| JP | 2013070841 | A | 4/2013 |
| WO | WO-2009094744 | A1 | 8/2009 |
| WO | WO-2012137078 | A2 | 10/2012 |
| WO | WO-2012142428 | A1 | 10/2012 |
| WO | WO-2013141874 | A1 | 9/2013 |
| WO | WO-2014146617 | A1 | 9/2014 |
| WO | WO-2015000912 | A1 | 1/2015 |
| WO | WO-2015039888 | A1 | 3/2015 |
| WO | WO-2015061983 | A1 | 5/2015 |
| WO | WO-2015062443 | A1 | 5/2015 |
| WO | WO-2015069407 | A1 | 5/2015 |
| WO | WO-2015071461 | A1 | 5/2015 |
| WO | WO-2015080407 | A1 | 6/2015 |
| WO | WO-2015103947 | A1 | 7/2015 |
| WO | WO-2015166087 | A2 | 11/2015 |
| WO | WO-2016029938 | A1 | 3/2016 |
| WO | WO-2017089183 | A1 | 6/2017 |
| WO | WO-2017167648 | A1 | 10/2017 |
| WO | WO-2017167835 | A1 | 10/2017 |
| WO | WO-2018001897 | A1 | 1/2018 |
| WO | WO-2018024395 | A1 | 2/2018 |

OTHER PUBLICATIONS

3GPP TS 23.246 V9.5.0, release 9 (Jun. 2010), "LTE; Multimedia Broadcast/Multicast Service (MBMS), Architecture and Functional Description," Universal Mobile Telecommunications System (UMTS), Technical Specification, ETSI TS 123 246, Jun. 2010, 67 pages.
3GPP TS 23.468 V15.0.0 (Release 15), "LTE; Group Communication System Enablers for LTE (GCSE_LTE) Stage 2," Technical Specification Group Services and System Aspect, 3rd Generation Partnership Project, ETSI TS 123 468 V15.0.0, Jul. 2018, 32 pages.
Alcatel-Lucent, "Analysis of Service Continuity Requirement for Group Communication," 3GPP Draft; R2-140757, 3GPP TSG RAN WG2 Meeting #85, and Agenda Item: 7.6.3, Prague, Czech Republic, Feb. 10-14, 2014, 3 pages.
CATT, "Considerations on Service Continuity for eMBMS," 3GPP Draft; R2-134045, 3GPP TSG RAN WG2 Meeting #84, agenda Item: 7.6.3, San Francisco, USA, Nov. 2013, 4 pages.
CATT, "Evaluation on Service Continuity for eMBMS," 3GPP Draft; R2-140138, 3rd Generation Partnership Project (3GPP), Mobile Competence Centre ; 650, Route Des Lucioles ; F-06921 Sophia-Antipolis Cedex; France, vol. RAN WG2, Feb. 9, 2014, retrieved from URL: http://www.3gpp.org/ftp/Meetings_3GPP_SYNC/RAN2/Docs/, 3 pages.
CATT, "Methods for Service Continuity Improvement due to UE Mobility," 3GPP Draft; R2-140141, 3GPP TSG RAN WG2 Meeting #85, Prague, Czech Republic, Feb. 10-14, 2014, 3 pages.
Combined search and Examination Report for Great Britain Application No. 1605519.6, dated Sep. 28, 2016, 4 pages.
Combined Search and Examination Report for Great Britain Application No. 1605525.3, dated Oct. 3, 2016, 8 pages.
Combined Search and Examination Report for Great Britain Application No. 1609547.3, dated Nov. 30, 2016, 6 pages.
Combined Search and Examination Report for Great Britain Application No. 1611277.3, dated Dec. 6, 2016, 8 pages.
Combined Search and Examination Report for Great Britain Application No. 1613477.7, dated Dec. 19, 2016, 5 pages.
Ericsson, "MBMS Service Continuity Aspects for Group Communication," 3GPP Draft; R2-140821, 3rd Generation Partnership Project (3GPP), Mobile Competence Centre; 650, Route Des Lucioles; F-06921 Sophia-Antipolis Cedex, France, vol. RAN WG2, Feb. 9, 2014, retrieved from URL: http://www.3gpp.org/ftp/Meetings_3GPP_SYNC/RAN2/Docs/, 11 pages.
ETSI TS 103 286-2 VI.I.1 (May 2015), "Technical Specification; Digital Video Broadcasting (DVB), Companion Screens and Streams, Part 2: Content Identification and Media Synchronization," 650 Route des Lucioles F-06921 Sophia Antipolis Cedex, France, http://www.etsi.org/deliver/etsi_tsll03200103299/10328602/01.01.01_60/ts10328602v010101p.pdf, retrieved on Apr. 24, 2018, 166 pages.
European Search Report for Application No. 16163451.4, dated Sep. 28, 2016, 8 pages.

(56) References Cited

OTHER PUBLICATIONS

European Search Report for Application No. 16163458.9, dated Sep. 20, 2016, 11 pages.
European Search Report for Application No. 16172341.6, dated Jun. 14, 2017, 10 pages.
European Search Report for Application No. 16182850.4, dated Jan. 17, 2017, 7 pages.
European Search Report for Application No. EP15196875.7, dated May 19, 2016, 6 pages.
"HbbTV 2.0.2 Specification," HbbTV Association, Retrieved on Apr. 24, 2018 from https://www.hbbtv.org/wpcontent/uploads/2018/02/HbbTVv202 specification_2018 02_16.pdf, Feb. 16, 2018, 313 pages.
Huawei, HiSilicon "Service Continuity for Group Communication Over eMBMS," 3GPP Draft; R2-140261, 3GPP TSG-RAN WG2 #85, Prague, Czech Republic, Feb. 10-14, 2014, 7 pages.
International Preliminary Report on Patentability for Application No. PCT/EP2017/057026, dated Oct. 11, 2018, 10 pages.
International Preliminary Report on Patentability for Application No. PCT/EP2017/057470, dated Oct. 11, 2018, 10 pages.
International Preliminary Report on Patentability for Application No. PCT/EP2017/057474, dated Oct. 11, 2018, 8 pages.
International Preliminary Report on Patentability for corresponding PCT Application No. PCT/EP2017/065543, dated Aug. 17, 2018, 29 pages.
International Search Report and Written Opinion for Application No. PCT/EP2016/077747, dated Jan. 24, 2017, 12 pages.
International Search Report and Written Opinion for Application No. PCT/EP2017/057026, dated Apr. 18, 2017, 14 pages.
International Search Report and Written Opinion for Application No. PCT/EP2017/057470, dated Jun. 19, 2017, 12 pages.
International Search Report and Written Opinion for Application No. PCT/EP2017/057474, dated Jun. 13, 2017, 14 pages.
International Search Report and Written Opinion for Application No. PCT/EP2017/064946, dated Jul. 10, 2017, 13 pages.
International Search Report and Written Opinion for Application No. PCT/EP2017/065543, dated Jul. 24, 2017, 17 pages.
LG Electronics Inc, "Service continuity for group communication," 3GPP Draft; R2-140766, 3GPP TSG RAN WG2 #85, Agenda Item: 7.6.3, Prague, Czech Republic, Feb. 10-14, 2014, 2 pages.
LTE, "Multicast Broadcast Single Frequency Network (MBSFN) Handbook," ShareTechnote, retrieved from http://www.sharetechnote.com/html/Handbook_LTE_MBSFN.html on Sep. 14, 2018, 13 pages.
NEC Corporation, "Enabling Service Continuity for Group Communication," 3GPP Draft; R2-140586_GCSE_SC, 3GPP TSG RAN2 Meeting #85, and Agenda Item: 7.6.3, Prague, Czech Republic, Feb. 10-14, 2014, 7 pages.

Prasad A., et al., "Enabling Group Communications for Public Safety in LTE-Advanced Networks," Journal of Network and Computer Applications, vol. 62, 2016, pp. 41-52.
Qualcomm Incorporated, "GCSE Service Continuity During Unicast and MBMS Switching," 3GPP Draft S2-133446 UC BC Switching, SA WG2 Meeting #99, Agenda Item: 6.5, Xiamen, China, Sep. 2013, 7 pages.
Qualcomm "LTE Evolved Multimedia Broadcast Multicast Service (eMBMS) Technology Overview," Qualcomm Research, San Diego, Nov. 2012, 18 pages.
Small Cell Forum, "X2 Interoperability," Release Four, Document 059.04.01, www.smallcellforum.org, Jun. 2014, 29 pages.
European Search Report for Application No. 16176922.9, dated Nov. 23, 2016, 11 pages.
International Preliminary Report on Patentability for Application No. PCT/EP2016/077747, dated Jan. 18, 2018, 10 pages.
DVB Organization: "ts_102796v010301 p_draft_23-non-etsi-branding.pdf", DVB, Digital Video Broadcasting, C/O EBU—17A Ancienne Route—CH-1218 Grand Saconnex, Geneva—Switzerland, Oct. 9, 2014 (Oct. 9, 2014), XP017845818.
ETSI TS 123.246 "Universal Mobile Telecommunication System (UMTS); LTE; Multimedia Broadcast/Multicast Service (MBMS); Architecture and Functional Description (Release 9)," V9.5.0 (Jun. 2010); the 3rd Generation Partnership Project, pp. 1-67.
Examination Report for Great Britain Application No. 1605519.6 dated Sep. 27, 2018, 4 pages.
Written Opinion of the International Preliminary Examining Authority for Application PCT/EP2017/065543, dated Jun. 1, 2018, 11 pages.
Wu, et al., "CloudMo V: Cloud-based Mobile Social TV," Retrieved on Apr. 24, 2018 from http://i.cs.hku.hk/~cwu/papers/ywutmm12.pdf, 2012, 12 pages.
ZTE, "Service Continuity for Group Communication due to UE Mobility," 3GPP Draft; R2-140101, 3GPP TSG-RAN WG2#85, and Agenda Item: 7.6.3, Prague, Czech Republic, Feb. 10-14, 2014, 3 pages.
U.S. Appl. No. 16/085,257, filed Sep. 14, 2018, Inventor(s): MacKenzie et al.
U.S. Appl. No. 16/085,328, filed Sep. 14, 2018, Inventor(s): Al-Daher et al.
U.S. Appl. No. 16/310,948, filed Dec. 18, 2018, Inventor(s): MacKenzie et al.
Application and Filing Receipt for U.S. Appl. No. 15/774,934, filed May 9, 2018, Inventor(s): Rennison et al.
Application and Filing Receipt for U.S. Appl. No. 16/318,533, filed Jan. 17, 2019, Inventors: Al-Daher et al.
Prasad et al; "Enhancements for Enabling Point-to-Multipoint Communication Using Unlicensed Spectrum"; https://www.reserachgate.net/publication/324783210; May 1, 2018; 7 pages.

* cited by examiner

MOBILE COMMUNICATIONS NETWORK

CROSS-REFERENCE TO RELATED APPLICATION

The present application is a National Phase entry of PCT Application No. PCT/EP2017/057026, filed Mar. 23, 2017, which claims priority from EP Patent Application No. 16163451.4, filed Mar. 31, 2016 each of which is hereby fully incorporated herein by reference.

TECHNICAL FIELD

The present disclosure relates to mobile communication networks and to a base station for a mobile communications network.

BACKGROUND

Multimedia content, such as video playback, live streaming, online interactive gaming, file delivery and mobile TV, is seen as the key driver for data traffic demand on wireless cellular networks. Multimedia content to a large number of users can be distributed by unicast, broadcast and multicast. In the following, the term "multicast" is used to include "broadcast" and vice versa. Unicast is a dedicated bidirectional point-to-point link for transmission between the base station and one user mobile device. Evolved Multimedia Broadcast Multicast Service (eMBMS) is an LTE technique offering a specific broadcast bearer to deliver data content to multiple users over shared downlink resources, which is more efficient than dedicating a unicast bearer for each user. Multicast-broadcast single-frequency network (MBSFN) further improves spectral efficiency by dynamically forming single-frequency networks whereby a mobile terminal (in LTE, the UE) can seamlessly receive the same content over eMBMS from multiple base stations (in LTE, the eNodeB) within a MBSFN area. A single-frequency network comprises groups of adjacent eMBMS base stations at which the same signal is synchronized and broadcast simultaneously on the same MBSFN sub-carrier frequencies and time-slots. The combination of eMBMS transmission from multiple base stations in a MBSFN service area provides a degree of transmission robustness in the form of spatial transmit diversity and effectively eliminates internal cell edges. However, a problem exists in handling the transfer of a mobile terminal between different MBSFN areas and between MBSFN and reserved unicast cells. A similar a problem exists in handling the transfer of a mobile terminal between eMBMS cells. Seamless mobility of the mobile terminals across an LTE network with different MBSFNs is not supported in 3GPP, so that service interruption may result, i.e. due to delays at the cell-edges while the mobile terminal acquires information about the targeted area or cell. Service interruption may also result when a the mobile terminal moves from a MBSFN providing an eMBMS broadcast service to a MBSFN where the service in question may only be available by unicast.

eMBMS and MBSFN basics are described in 3GPP TS 123.246 Multimedia Broadcast/Multicast Service (MBMS); Architecture and functional description (Release 9), V9.5.0 (2010-06); the 3rd Generation Partnership Project (http://www.3gpp.org).

SUMMARY

The present disclosure accordingly provides, in a first aspect, a method of operating a base station for a mobile communications network, in which the base station is in communication with a plurality of mobile terminals; in which the method comprises the base station: interrogating each of the plurality of the mobile terminals for an indication of signal quality of a signal received by the mobile terminal; dividing the plurality of the mobile terminals between a first group and a second group based on the received indications of signal quality, in which the indications received from the mobile terminals in the first group indicate relatively low signal quality and in which the indications received from the mobile terminals in the second group indicate relatively high signal quality; and communicating with at least some of the mobile terminals in the first group over unicast and communicating with the mobile terminals in the second group over multicast.

In this way mobile devices located nearer to the edge of a cell may be switched to unicast in a timely manner before transferring to be served by a different base station, i.e. before the handover process. In particular, embodiments of the disclosure can enhance mobile terminal mobility for eMBMS services operating in MBSFN architectures so as to reduce service interruption when a mobile terminal moves between MBSFN areas or between eMBMS base stations.

According to an embodiment, the present disclosure provides: the base station communicating over unicast with mobile terminals in the first group that were previously in the second group and subsequently moved into the first group; and communicating over multicast with all other mobile terminals in the first group.

According to an embodiment, the first group is served by a first set of resources and the second group is served by a second set of resources. According to an embodiment, the first set of resources is a subset of the second set of resources. Here, a resource is a sub-division of the total radio resources available for communication between mobile terminals and the base station and may be defined as a sub-division of the frequency domain (e.g. a particular frequency range) or as a combination of frequency and time domain a sub-divisions (e.g. a time slot at a particular frequency range).

The present disclosure accordingly provides, in a second aspect, a base station for a mobile communications network, in which the base station comprises: a plurality of transmitters, in which each transmitter is configured to provide transmit radio signals to a plurality of mobile terminals; a plurality of receivers, in which each receiver is configured to detect receive radio signals from the plurality of mobile terminals; and a processor configured to: interrogate each of the plurality of the mobile terminals for an indication of signal quality of a signal received by the mobile terminal; and assign each of the plurality of the mobile terminals to one of two groups based on the received indications of signal quality, in which the indications received from the mobile terminals assigned to the first group indicate relatively low signal quality and in which the indications received from the mobile terminals assigned to the second group indicate relatively high signal quality; in which the plurality of transmitters are configured to communicate with at least some of the mobile terminals in the first group over unicast and to communicate with the mobile terminals in the second group over multicast.

According to an embodiment, the plurality of transmitters are configured to communicate over unicast with mobile terminals in the first group that were previously in the second group and subsequently moved into the first group;

and in which the plurality of transmitters are configured to communicate over multicast with all other mobile terminals in the first group.

According to an embodiment, a decision to assign each of the plurality of the mobile terminals to one of two groups is based on a signal quality threshold value, in which an indication of signal quality that falls below the threshold value is deemed to indicate a relatively low signal quality while an indication of signal quality that falls above the threshold value is deemed to indicate relatively high signal quality; in which the threshold value is variable, dependent on at least one of the radio resource usage load at the base station and traffic levels on communications channels between the base station and the plurality of the mobile terminals.

According to an embodiment, a decision to assign each of the plurality of the mobile terminals to one of two groups is based on a signal quality threshold value, in which an indication of signal quality that falls below the threshold value is deemed to indicate a relatively high signal quality while an indication of signal quality that falls above the threshold value is deemed to indicate relatively low signal quality; in which the threshold value is variable, dependent on at least one of the radio resource usage load at the base station and traffic levels on communications channels between the base station and the plurality of the mobile terminals.

According to an embodiment, the plurality of transmitters are configured to communicate with the first group over a different frequency when compared to the second group.

According to an embodiment, the indication of signal quality is based on at least one of: serving cell reference signal, channel quality, signal-to-noise ratio, signal-to-interference-plus-noise ratio, block-error-rate and neighbor cell reference signal level.

According to an embodiment, the plurality of transmitters are configured to communicate with the first group using a first set of resources and in which the plurality of transmitters are configured to communicate with the second group using a second set of resources.

The present disclosure accordingly provides, in a third aspect, a computer program element comprising computer program code to, when loaded into a computer system and executed thereon, cause the computer to perform the steps of the method set out above.

BRIEF DESCRIPTION OF THE DRAWINGS

In order that the present disclosure may be better understood, embodiments thereof will now be described, by way of example only, with reference to the accompanying drawings in which.

DETAILED DESCRIPTION

Embodiments of the disclosure enhance mobile terminal mobility for eMBMS services operating in MBSFN architectures so as to reduce service interruption when a mobile terminal moves between MBSFN areas or between eMBMS cells. The disclosure relates to techniques that can enable service switching from broadcast to unicast when a mobile terminal is moving from being served by a base station within a first MBSFN area towards being served by a base station within another MBSFN area. In particular, embodiments of the disclosure can avoid service interruption by defining triggers for initiating switching eMBMS service for the mobile terminal from broadcast to unicast before the mobile terminal is transitioned to being served by a base station in another MBSFN area. According to an embodiment, the trigger is independent of the decision to transition the mobile terminal to being served by the target base station.

According to an embodiment, the disclosure exploits interference management techniques, such as Inter-Cell Interference Coordination (ICIC), to trigger the switching to unicast communication of some mobile terminals being served by a base station close to the boundary between two MBSFN areas. According to another embodiment, the disclosure exploits such interference management techniques to trigger the switching to unicast communication of some mobile terminals close to a boundary between two eMBMS base stations. Use of partial or fractional reuse techniques by a base station form the basics of ICIC in LTE, whereby the available spectral bandwidth in a cell is managed in a way to reduce interference throughout the cell. According to ICIC techniques such as fractional frequency reuse (FFR), hard frequency reuse (HFR) and soft frequency reuse (SFR), each cell supports a set of resources that are subject to lower interference from neighboring cells. The base station can use this a set of resources to improve the service provided to mobile terminals served by the base station that are located towards the cell edge (i.e. close to a region where the mobile terminals can experience signals from a neighboring base station that are of similar strength to signals received from the serving base station, so that the signals from the neighboring base station may cause interference with the signals from the serving base station).

Interference management is designed to reduce interference throughout a cell and, in particular, in the areas towards the edges of a cell. To achieve this, the plurality of mobile terminals served by a base station are divided between a number of groups, for example first group and a second group depending on the received signal quality reported to the serving base station by the mobile terminal, where mobile terminals of the first group report a lower signal quality and mobile terminals of the second group report a higher signal quality. The inventors have determined that mobile terminals reporting a lower signal quality are more likely than the mobile terminals reporting a higher signal quality to be located near the edge of the cell and are more likely to transition to a target, neighboring base station. According to the disclosure, where a cell lies at a boundary between two different MBSFN areas or between two eMBMS base stations, all mobile terminals in the first group or, alternatively, only mobile terminals transferring from the second group to the first group are restricted to unicast transmission, while the mobile terminals in the second group or, alternatively, the mobile terminals in the second group combined with the mobile terminals in the first group that have not transferred from the second group, will use multicast. In this way, the mobile terminals that are likely to transition to a target eMBMS cell or to a cell in another MBSFN area are switched to unicast in a timely manner.

When a mobile terminal using multicast moves out of an MBSFN area into another MBSFN area or to a cell that does not provide the required MBMS service, then service interruption may be expected. For mobility between MBSFN areas, there is anticipated to be a service interruption of around 1.5 seconds. This is a combination of mobility time plus the time to read and decode system information block (SIB) messages of the new serving cell (see FIG. 3). For mobility to a non-MBSFN cell the interruption is anticipated to be around 0.5 seconds. This includes time to read the SIBs of the new serving cell and then to setup a unicast bearer. Switching a mobile terminal from a multicast service to a unicast service reduces service interruption when moving out of an MBSFN area (whether moving into another MBSFN area or to a non-MBSFN cell). Where the switch to unicast occurs while the mobile terminal is still receiving good coverage of its serving base station, then the switch to unicast should further reduce service interruption. For example minimal interruptions may result from an increased likelihood of achieving make-before-break service continuity from multicast to unicast and a reduced likelihood of random access channel failure (which can adversely affect initial call setup step and registration). Where a base station takes responsibility for managing the transition of a mobile terminal that is moving out of an MBSFN area to a different MBSFN area, it can appropriately manage the timing of a transition from multicast to unicast. This removes risk of service interruptions for mobile terminals entering a different MBSFN area (as service interruption for switching from unicast to multicast can be zero).

Figure 1:
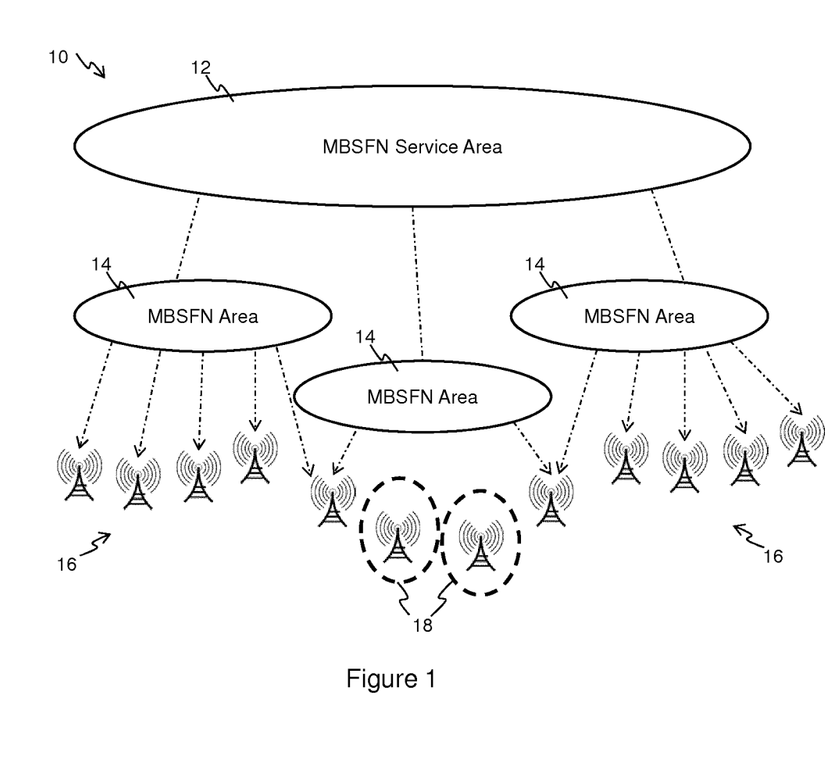
FIGS. 1 and 2 show a conventional 3GPP mobile communications network.

In Evolved Universal Terrestrial Radio Access Network (E-UTRAN), eMBMS services may be provisioned by defining MBSFN areas within a geographical area designated for broadcast (or multicast) services. A broadcast service area could be a single cell or multiple cells. A multi-cell MBSFN area defines a set of base stations participating in MBSFN service modes. FIG. 1 illustrates a MBSFN network structure. Within MBSFN network 10, an operator operates a MBSFN service area 12 for deploying a broadcast (or multicast) service. Within that service area there may be a plurality of MBSFN areas 14. Each MBSFN area 14 consists of a number of base stations 16, each serving a different cell (not shown). The base stations 16 in a particular MBSFN area 14 are capable of synchronizing together to provide the MBSFN service across multiple cells in the MBSFN area. Some of the base stations 16 within the MBSFN areas 14, serve reserved cells 18. A MBSFN reserved cell is a cell within a MBSFN area that does not contribute to the MBSFN transmission and may be used for other services, e.g. unicast. Within a MBSFN area, eMBMS can be provided over a single frequency layer dedicated to MBSFN transmission or over a single frequency layer that is shared between MBSFN transmission and unicast services. Where Radio Resource Control (RRC) is used, reception of eMBMS services is available for the mobile terminals in RRC_Connected or RRC_Idle states.

LTE supports overlap between MBSFN service areas, for example, smaller MBSFN areas can overlap larger ones for regional and national coverage. In 3GPP LTE or 4G, one base station can belong to up to eight MBSFN areas. All base stations transmitting MBSFN in a single area are required to be synchronized, so that the same multimedia content is transmitted from all the base station stations with a mutual offset of no more than a few micro-seconds.

Figure 2:
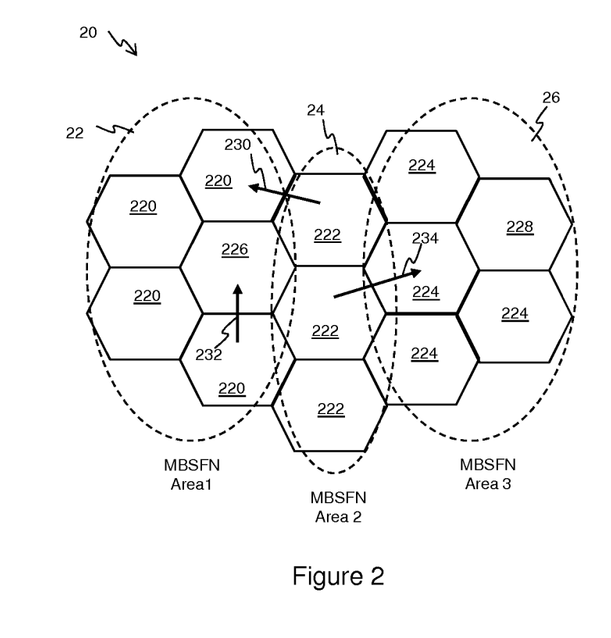

One of the key features of the LTE network is mobility provision. Supporting seamless user mobility across the network requires service continuity for eMBMS users and plays an important role in maintaining service quality and customer satisfaction. There are a number of scenarios where it would be desirable for a LTE mobile terminal to be able to move from one base station to another whilst receiving MBSFN service, for example when a the mobile terminal is moving into a MBSFN area reserved cell whilst receiving an eMBMS service and when moving from one MBSFN cell to another cell not within the same MBSFN area. FIG. 2 shows MBSFN service area 20 comprising exemplary MBSFN areas 22, 24 and 26—each MBSFN area comprising a plurality of cells, each cell defined by a different base station (not shown). MBSFN area 22 comprises a plurality of multicast cells 220 and one MBSFN area reserve (unicast) cell 226. MBSFN area 24 comprises a plurality of multicast cells 222 but no MBSFN area reserve (unicast) cell. MBSFN area 26 comprises a plurality of multicast cells 224 and one MBSFN area reserve (unicast) cell 228. Exemplary transitions between the cells of MBSFN service area 20 are shown, as follows. Transitions 230 and 234 represent a mobile terminal passing from one multicast cell to another multicast cell in a different MBSFN area. Transition 232 represents a mobile terminal passing from a multicast cell to an MBSFN area reserved cell in the same MBSFN area. 3GPP standards do not describe any mechanism for switching a mobile terminal that is receiving a multicast service from multicast to unicast.

According to an embodiment, the disclosure leverages interference management techniques practiced by base stations to trigger switching mobile terminals to unicast. According to this embodiment, mobile terminals are classified in a dynamic manner by the base station as reporting either lower or higher signal quality. In this example, the two groups of mobile terminals (i.e. lower signal quality and higher signal quality) are assigned different sets of resources (e.g. different sub-channels or time slots). The base station decides what set of resources to assign to each group. The base station may change resource assignments (e.g. assign more resources to the cell edge group and fewer resources to the cell centre group). The resources assigned to a mobile terminal will normally be from the resources assigned to the group of which it is a member. However schedulers may occasionally assign resources to a mobile terminal from the other group's resources when the mobile terminal's own group is short of resources and the other group has resources to spare (e.g. when there is little traffic for mobile terminals in the lower signal quality group, the assigned resources could be scheduled for mobile terminals in the higher signal quality group).

Figure 4A:
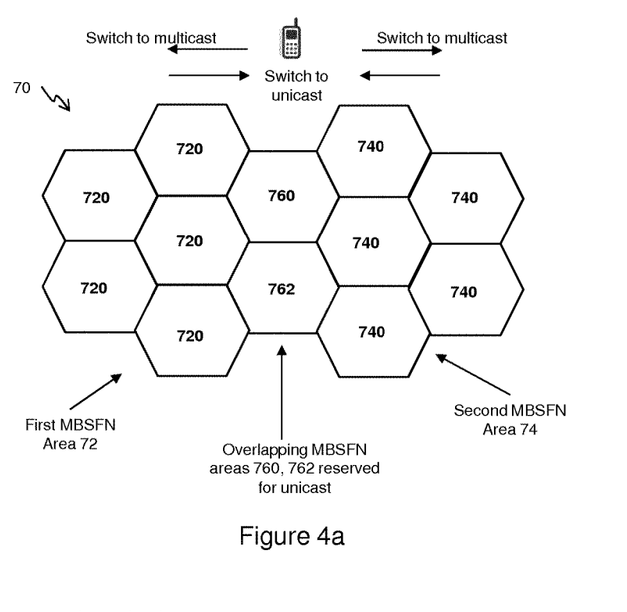
FIGS. 4a and 4b shows a mobile communications network according to an embodiment of the disclosure.

FIG. 4a shows a mobile communications network, by way of example, a LTE network 70 comprising a first MBSFN area 72 comprising cells 720 and a second MBSFN area 74 comprising cells 740. First MBSFN area 72 and a second MBSFN area 74 overlap at cells 760 and 762, which form part of both first and second MBSFN areas. Shared cells 760, 762 are frequency reuse cells that are divided between two sets of resources. As indicated above, in a frequency reuse cell, the mobile terminals are divided between a first group and a second group depending on the received signal quality reported by the mobile terminal. The first group is served by a first set of resources and the second group by a second set of resources. The first set of resources may also be referred to as an "outer set", because the mobile terminals allocated to this set are those reporting a lower signal quality and this is more likely to mean that the mobile terminals in this set are farther away from the base station. Similarly, the second set of resources may also be referred to as an "inner set", because the mobile terminals allocated to this set are those reporting a higher signal quality and this is more likely to mean that the mobile terminals in this set are closer to the base station. According to an embodiment, the first set of resources may be a sub-set of the second set of resources. The other cells 720, 740 in first MBSFN area 72 and second MBSFN area 74 are multicast. First MBSFN area 72 therefore comprises multicast cells 720 and frequency reuse cells 760, 762 and serves a first eMBMS service. Second MBSFN area 74 therefore comprises multicast cells 740 and frequency reuse cells 760, 762 and serves a second eMBMS service.

Figure 4B:
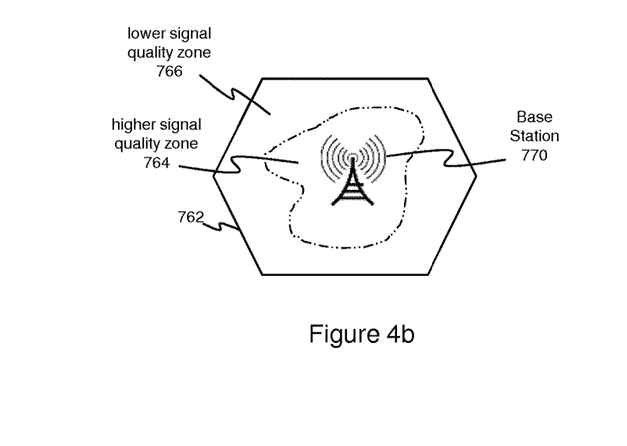

FIG. 4b shows shared frequency reuse cell 762 in more detail. Each cell comprises a base station, although only base station 770 in cell 762 is shown. The base station 770 allocates the mobile terminals operating in cell 762 to one of two sets of resource: an inner resource set and an outer resource set. This allocation can be thought of as creating two zones within the cell. FIG. 4b shows, for example, zone 764 located towards the centre of the cell 762 serving terminals in the higher signal quality group and zone 766 located towards the periphery of the cell serving terminals in the higher signal quality group. In reality these zones may not have the clearly-defined boundary indicated in FIG. 4b and could overlap. Mobile terminals operating in MBSFN cells at the boundary between MBSFN areas can accordingly be divided between the higher signal-quality zone 764 and the lower signal-quality zone 766, whereby resources in the lower signal-quality zone are reserved to unicast transmission only. According to an alternative embodiment, only mobile terminals transferring from the higher signal-quality group to the lower signal-quality group are restricted to unicast transmission, so that the resources in the lower signal-quality zone 766 may support unicast and multicast transmission for different mobile terminals. Typically a mobile terminal will be allocated to one of the groups based on comparing a signal quality parameter threshold value with a signal quality parameter (such as the signal-to-noise ratio (SNR) or signal-to-interference-plus-noise ratio (SINR)) reported by the mobile terminal, that the mobile terminal is experiencing. Other parameters that can be used to determine the group for a mobile terminal include: serving-cell reference signal-level, channel quality information, block-error-rates and neighbor cell reference signal-level. A low value of any of: serving cell reference signal, channel quality, SNR and SINR or a high value of any of: block-error-rates and neighbor cell reference signal would increase the likelihood that the mobile terminal would be allocated to the outer resource set. The mobile terminals indicating a low value of serving cell reference signal, channel quality, SNR or SINR or a high value of block-error-rates or neighbor cell reference signal are more likely to transfer to a different base station as the respective parameter value probably indicates that the mobile terminal is approaching the point where a signal from the different base station in an adjacent MBSFN cell would provide a better quality of service. In this way, the mobile terminals that are likely to transition to a cell in another MBSFN area are switched to unicast in a timely manner before handover. According to an embodiment, the rate of transfer of the mobile terminals from inner resource set to outer resource set, i.e. from multicast to unicast, may be regulated so as to control the load (since unicast places a higher load). The load may be defined as at least one of: the radio resource usage load at the base station and traffic levels on communications channels between the base station and the plurality of the mobile terminals. In particular, the number of unicast mobile terminals in the cell can be controlled by adjusting a parameter threshold used to discriminate between higher and lower signal quality.

The mobile terminal eMBMS procedures are now described in more detail. LTE eMBMS protocol architecture consists of physical, transport and logical layers, with the physical layer supporting a radio interface between the mobile terminal and base station. The radio interface comprises two point-to-multipoint logical channels for eMBMS: Multicast Control Channel (MCCH) and Multicast Traffic Channel (MTCH). The MCCH is a logical channel that exists in the control plane of the radio interface between the mobile terminal and the base station and is used to broadcast eMBMS related Radio Resource Control (RRC) protocol messages. Information carried by MCCH includes sub-frame allocation and modulation and coding scheme (MCS) configuration. MTCH on the other hand exists in the user plane of the radio interface between the mobile terminal and the base station. MTCH is a logical channel and carries the eMBMS application data. One or more MTCH are mapped to the multicast channel (MCH) in order to obtain multiplexing gains while only one MCCH is multiplexed onto MCH. Each MCCH corresponds to an MBSFN area. Different MCCHs are assigned for different MBSFN areas. In the case where multiple MBSFN areas overlap, one base station could provide multiple MCCHs broadcasted in different MBSFN sub-frames. Both MCCH and MTCH are mapped to the MCH by the media access control (MAC) sub layer. MCH is mapped to a physical multicast channel (PMCH) The PMCH is very similar to the physical downlink shared channel (PDSCH) in unicast mode. MCH is transmitted over MBSFN in specific sub frames.

Figure 3:
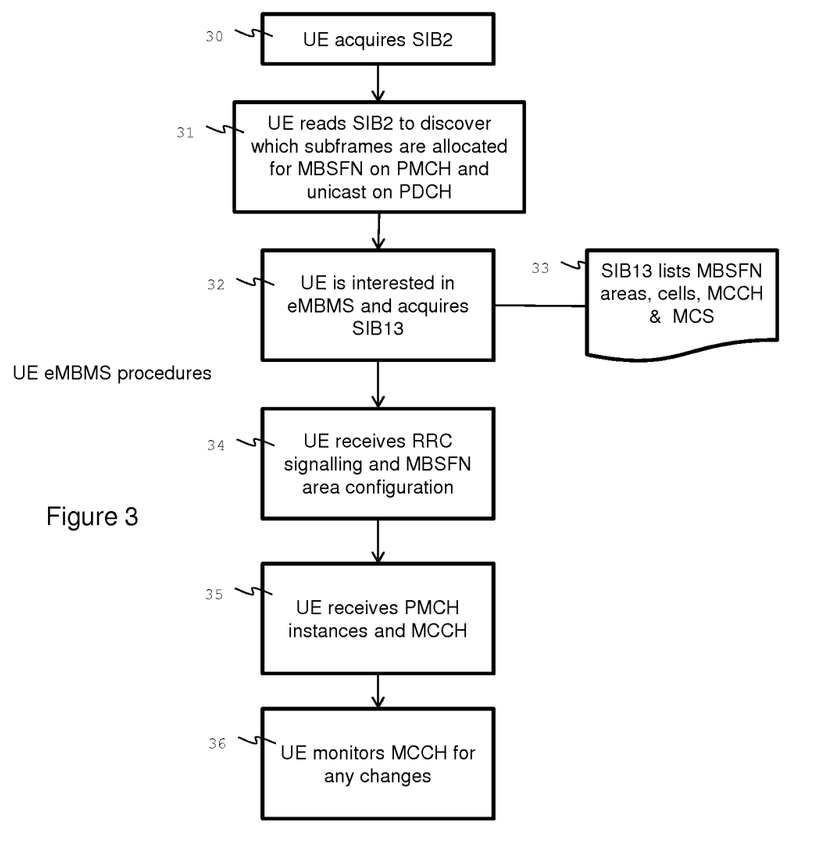
FIG. 3 shows a sequence of events according to an embodiment of the disclosure.

With reference to FIG. 3, at 30, the mobile terminal acquires from the serving base station a system information block type 2 (SIB2) containing radio resource configuration information that is common for all the mobile terminals. At 31, the mobile terminal reads SIB2 to discover which sub-frames are allocated for MBSFN on PMCH and unicast on PDCH. At 32, the mobile terminal, being interested in eMBMS, acquires SIB13, which contains information required to acquire the MBMS control information associated with one or more MBSFN areas. For example, SIB13 lists: MBSFN areas, cells, MCCH and MCS. At 34, the mobile terminal receives from the base station RRC signaling and MBSFN area configuration information and, at 35, the mobile terminal receives PMCH instances and MCCH. At 36, the mobile terminal monitors MCCH for any changes.

3GPP Release 12 has introduced a Group Communication Server Application Server (GCS AS). The GCS AS function is to signal to the mobile terminal the required configuration information that the mobile terminal needs in order to receive application data via eMBMS bearer services. As the mobile terminal detects it is moving away from the MBSFN area, for example by detecting a poor MBSFN signal quality or by monitoring one of the other parameters, listed above, it elects to receive data over unicast whilst it is still able to communicate effectively with the serving MBMS cell. The mobile terminal sets up a unicast flow to receive eMBMS data via unicast and, accordingly, ceases receiving eMBMS data via MBSFN. The mobile terminal is able to receive the eMBMS data from unicast and MBMS simultaneously thereby avoiding service interruption during this switching process. At a later time, the mobile terminal notifies the GCS AS that it is approaching the limit of communicating effectively with the serving MBSFN cell and will soon be too far from the serving MBMS cell to guarantee reliable operation and so initiates transition to a cell that is able to provide the mobile terminal with a stronger signal.

Switching from unicast delivery to eMBMS is also possible if the mobile terminal happens to enter an adjacent MBSFN area. The mobile terminal has ongoing communications with GCS AS, which will inform the mobile terminal when eMBMS delivery is available over MBSFN—along with the corresponding bearer service configurations. Whilst the mobile terminal is still receiving downlink unicast delivery, when eMBMS delivery becomes available over MBSFN, the mobile terminal can start receiving MBMS scheduling information over MCH and eMBMS bearer over MTCH. During this switching period, the mobile terminal will receive the eMBMS data from both unicast and MBMS. The mobile terminal will then notify the GCS AS that it is within the adjacent MBSFN area and that it is receiving eMBMS bearer service. The GCS AS will then stop the unicast delivery to the mobile terminal, which now will only receive services over MBSFN.

Figure 5:
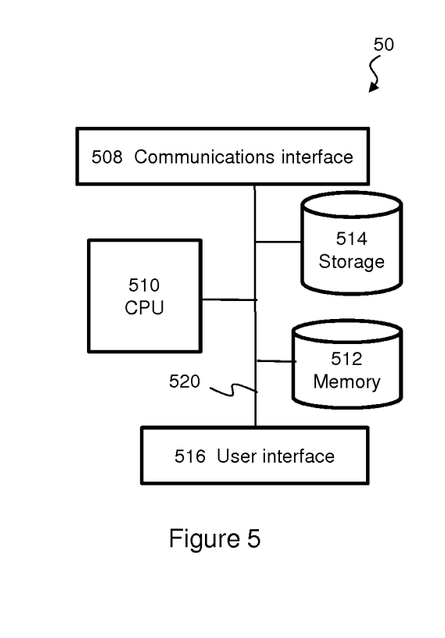
FIG. 5 is a block diagram of a computer system suitable for the operation of embodiments of the present disclosure.

FIG. 5 is a block diagram of a computer system 50 suitable for the operation of embodiments of the present disclosure. A central processor unit (CPU) 510 is communicatively connected to communications interface 508, a memory 512, a storage 514 and an input/output (I/O) interface 516 via a data bus 520. The memory 512 can be any read/write storage device such as a random access memory (RAM) or a non-volatile storage device suitable for storing data for use by processor 512. The storage 514 can be any read-only or read/write storage device such as a random access memory (RAM) or a non-volatile storage device suitable for storing program code for controlling the operation of processor 510. Memory 512 and storage 514 may comprise the same device or devices. An example of a non-volatile storage device includes a disk or tape storage device. The user interface 516 is an interface to devices for the input or output of data provided to or received from a user or operator of computer system 50. Examples of I/O devices connectable to user interface 516 include a keyboard, a mouse, a display (such as a monitor) and a network connection. Communications interface 508 is an interface to other devices and may comprise one or more radio transmit interfaces and one or more wired or wireless core network interfaces.

The present disclosure has application to audio and video broadcasting but also file broadcasting in mobile networks. In addition to mobile networks, the present disclosure may also have application to femtocell and small cell deployments, for example, in pre-loading certain content on devices to enhance QoE and optimize use of resources. Similar scenarios may arise for simultaneous software updates on multiple devices. The present disclosure has been described in an LTE context that could be deployed with existing multicast mobile networks, but the invention can be applied in any multicast mobile network where the network elements have similar roles regarding unicast and multicast service provision. The present disclosure has been described, by way of example and for reasons of economy, in relation to a specific set of parameters however, it will be appreciated that the disclosure is not limited to any particular measure of signal quality but can be implemented based on any reliable technique for characterizing signal quality.

As set out in the Abstract hereto, the disclosure relates to a base station for a mobile communications network, in which the base station comprises: a plurality of transmitters, in which each transmitter is configured to provide transmit radio signals to a plurality of mobile terminals; and a plurality of receivers, in which each receiver is configured to detect receive radio signals from the plurality of mobile terminals. The base station also comprises a processor configured to interrogate each of the plurality of the mobile terminals for an indication of signal quality of a signal received by the mobile terminal; and to assign each of the plurality of the mobile terminals to one of two groups based on the received indications of signal quality. The mobile terminals assigned to the first group are those that indicate relatively low signal quality and the mobile terminals assigned to the second group are those that indicate relatively high signal quality. The plurality of transmitters are configured to communicate with at least some of the mobile terminals in the first group over unicast and to communicate with the mobile terminals in the second group over multicast. The disclosure also relates to a corresponding method for operating a base station for a mobile communications network.

According to an embodiment, from time to time, during operation, it is possible that one or other group may have no members. During such occurrences, the operation for the embodiment may comprise either: waiting for one or more mobile terminals to report signal quality that indicated that the one or more mobile terminals belonged in the empty group or, alternatively, waiting for the threshold to adjust so that teach group had members.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present disclosure has been described in relation to the above described example embodiments, the invention is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for operating a base station for a mobile communications network, wherein the base station is in communication with a plurality of mobile terminals, the method comprising, by the base station:

interrogating each of the plurality of the mobile terminals for an indication of signal quality of a signal received by the mobile terminal;

assigning each mobile terminal of the plurality of mobile terminals to one of two groups based on the indications of received signal quality, in which the indications received from the mobile terminals assigned to a first group indicate relatively low signal quality and in which the indications received from the mobile terminals assigned to a second group indicate relatively high signal quality, in which the first group is served by a first set of resources and the second group is served by a second set of resources, whereby the first group is a subset of the second group and is subject to lower interference from a neighboring base station than a remainder of the second group;

communicating with at least some of the mobile terminals assigned to the first group over unicast and communicating with the mobile terminals assigned to the second group over multicast;

wherein a decision to assign each mobile terminal of the plurality of mobile terminals to one of the first group or the second group is based on comparing the indication of signal quality for that mobile terminal with a signal quality threshold value; and wherein the threshold value is variable, dependent on at least one of a radio resource usage load at the base station or traffic levels on communications channels between the base station and the plurality of the mobile terminals.

2. The method of claim 1, further comprising:

communicating over unicast with mobile terminals assigned to the first group that were previously in the second group and were subsequently assigned to the first group; and communicating over multicast with at least some other mobile terminals assigned to the first group.

3. The method of claim 1, wherein the first group is served over a different frequency when compared to the second group.

4. The method of claim 1, wherein the indication of signal quality is based on at least one of: serving cell reference signal, channel quality, signal-to-noise ratio, signal-to-interference-plus-noise ratio, block-error-rate, or neighbor cell reference signal level.

5. A non-transitory computer-readable storage medium storing a computer program element comprising computer program code to, when loaded into a computer system and executed thereon, cause the computer to perform the method as claimed in claim 1.

6. A base station for a mobile communications network, wherein the base station comprises:

a plurality of transmitters, each transmitter configured to transmit radio signals to a plurality of mobile terminals;

a plurality of receivers, each receiver configured to receive radio signals from the plurality of mobile terminals; and a processor configured to:

interrogate each of the plurality of the mobile terminals for an indication of signal quality of a signal received by the mobile terminal, and assign each mobile terminal of the plurality of the mobile terminals to one of two groups based on the indications of received signal quality, in which the first group is served by a first set of resources and the second group is served by a second set of resources, whereby the first group is a subset of the second group and is subject to lower interference from a neighboring base station than a remainder of the second group;

wherein the base station is configured such that:

a decision to assign each mobile terminal of the plurality of mobile terminals to one of a first group or a second group is based on comparing the indication of signal quality for that mobile terminal with a signal quality threshold value, wherein the threshold value is variable, dependent on at least one of a radio resource usage load at the base station or traffic levels on communications channels between the base station and the plurality of the mobile terminals; and wherein the plurality of transmitters are configured to communicate with at least some of the mobile terminals in the first group over unicast and to communicate with the mobile terminals in the second group over multicast.

7. The base station of claim 6, wherein the plurality of transmitters are configured to communicate over unicast with mobile terminals assigned to the first group that were previously in the second group and subsequently assigned to the first group; and wherein the plurality of transmitters are configured to communicate over multicast with all other mobile terminals assigned to the first group.

8. The base station of claim 6, wherein the plurality of transmitters are configured to communicate with the first group over a different frequency when compared to the second group.

9. The base station of claim 6, wherein the indication of signal quality is based on at least one of: serving cell reference signal, channel quality, signal-to-noise ratio, signal-to-interference-plus-noise ratio, block-error-rate, or neighbor cell reference signal level.

* * * * *